UNITED STATES PATENT OFFICE.

WILLIS A. GIBBONS, OF FLUSHING, NEW YORK, ASSIGNOR TO AMERICAN RUBBER COMPANY, A CORPORATION OF MASSACHUSETTS.

PROCESS FOR VULCANIZING RUBBER AND SIMILAR MATERIALS.

1,350,798.  Specification of Letters Patent.  Patented Aug. 24, 1920.

No Drawing.  Application filed December 11, 1916.  Serial No. 136,388.

*To all whom it may concern:*

Be it known that I, WILLIS A. GIBBONS, a citizen of the United States, residing at Flushing, L. I., in the county of Queens and State of New York, have invented certain new and useful Improvements in Processes for Vulcanizing Rubber and Similar Materials, of which the following is a full, clear, and exact description.

This invention relates to processes for vulcanizing rubber and similar materials. It is more particularly directed to a process of hot fluid vulcanization carried on at substantially atmospheric pressure.

Heretofore hot fluid vulcanization at atmospheric pressure has been restricted to the so-called open cure which has been principally used for the vulcanization of shoes and similar articles. This vulcanization has been carried on in air and the use of this medium has required incorporation of litharge or similar accelerator with the stock. Litharge, as is well known, causes darkening of the resultant vulcanized products. Omission of litharge has prevented satisfactory vulcanization in the open cure. Articles have been vulcanized in media other than air, e. g. carbon dioxid or steam, with or without litharge being incorporated in the rubber compound. The usual practice for such vulcanization in the absence of air has required the use of carefully constructed vulcanizing apparatus. Such apparatus is made gas-tight to avoid loss of carbon dioxid and the chamber is connected in a closed circuit with the gas-supply tank. Any desired pressure either above that of the atmosphere or at a pressure equal to atmospheric pressure or below atmospheric pressure, with the use of suitable evacuating apparatus, may be maintained in the circuit by suitably throttling the intake-pipe connected with the source of carbon dioxid or other gas. It will be obvious that the provision and maintenance of such closed circuit necessitates heavy, expensive apparatus which is necessarily limited in its size. Due to the restricted space in such vulcanizers the articles placed therein must be in a compact state and it has hence not been practicable to drape fabric or to hang loose articles such as raincoats therein. Furthermore, particularly in the use of steam under pressure, where such pressure is relatively low, there is the disadvantage that materials which are susceptible to injury by water in liquid form may be discolored or otherwise injuriously affected by such process.

Applicant's principal object has been, accordingly, to provide a simple and efficient process which shall overcome the disadvantages inherent in the open cure, employing air, as mentioned above, and processes employing other media such as carbon dioxid, as heretofore practised.

Briefly stated, the invention consists in applying to a vulcanizable plastic such as rubber inclosed in a chamber, steam or similar inexpensive inert gas superheated to a vulcanizing temperature, and vulcanizing the rubber while maintaining communication between the chamber and the atmosphere.

In connection with my process any suitable open chamber, for example a chamber made of galvanized sheet iron protected on the outside by wood or other non-conducting material similar to that employed in the open-air cure, may be used. The chamber should, of course, be tightly constructed but need not be built to withstand pressure. On the floor of the chamber is placed a series of steam coils in sufficient number to provide a rapid and uniform heating of the atmosphere in the chamber. Steam inlets connected to a steam main under high pressure are provided at the top of the chamber. Air-inlets are preferably located at or near the bottom of the chamber, these air-inlets being preferably connected to a source of pre-heated air. Suitable outlets, for example, valves of any desired form are located in the top and bottom of the chamber and communicate directly with the atmosphere. They provide a means for maintaining the chamber in communication with the atmosphere. Temperature indicating means for ascertaining the interior temperature may be provided at any convenient point.

In carrying out my process in its preferred form, the chamber mentioned is preferably closed and heated by the closed coil to such temperature that an operative may still enter to place articles therein. Rubberized fabrics, clothing or other articles are then placed in the open chamber. The articles may be colored or otherwise and if colored, to avoid darkening therein, litharge or similar darkening agent may be omitted from the rubberizing compound. All outlets and inlets being closed the temperature of the heater is regularly raised by the closed coils to a point slightly above 212° F., say 220° F. When the articles show by test that they have reached approximately 212° F. the air-outlets at the bottom of the chamber are opened and an inert gas, preferably live steam under approximately 85 pounds pressure, from the top inlets is run into the interior. The air within the chamber is displaced by the steam. Steam is then passed through the closed coils in the bottom of the chamber to raise the temperature of the atmosphere in the interior of the vulcanizer as rapidly as possible to the desired point of vulcanization, say 275° F.

The admission of live steam is continued until it is observed that steam is passing in large volumes from the air outlet into the atmosphere. The steam inlet valves are then partially closed and just sufficient steam is run through the vulcanizer to insure a constant, slow passage thereof through the outlet in the bottom of the chamber. Such constant flow prevents the passage of air into the closed chamber. It has been found desirable to exclude air under ordinary circumstances although with certain kinds of vulcanization it may be possible and even desirable to permit the presence of small quantities of air in connection with the steam in the chamber.

Under the conditions mentioned it will be noted that the rubber articles contact with steam superheated to a vulcanizing temperature in a chamber open to the atmosphere and under these conditions vulcanization is continued until the desired degree thereof is effected. At such time the steam is shut off from the steam inlet-pipe but heating by the coils is continued. The air outlet in the bottom of the chamber is closed thus cutting off communication with the atmosphere, and air preferably preheated to about the same temperature as that used in vulcanization, approximately 275° F. is forced in through the air inlet-pipe in the bottom. The steam outlet-valve in the top of the chamber is opened at the same time and the steam is displaced gradually by air at the same temperature and passes from the chamber. When it is evident that the steam is practically removed the chamber is opened and after cooling to permit convenient handling the goods may be removed therefrom.

The process as thus carried on is simple and efficient. It does not require the use of expensive pressure-tight apparatus. The vulcanizing medium, live steam, is extremely inexpensive and easy to handle. Various kinds of articles may be vulcanized by the process without restriction as to their compactness. Furthermore various compounds free from litharge or similar darkening agent may be vulcanized thereby and thus articles of brilliant and varying colors may be obtained. The process thus finds application to balloon and aeroplane fabrics of various sorts; raincoats and raincoat fabrics; carriage cloth in other colors than black to which it is now limited; leather substitutes and articles made therefrom in tan or various other colors (such leather substitutes have been heretotfore limited to black); rubber footwear, including black, white and tan; hospital and other white colored sheetings.

It will be understood that although live steam has been mentioned as the preferred vulcanizing medium that other various inert gases may be employed in place thereof. It will furthermore be observed that although rubber has been specified as the preferred vulcanizable plastic various other similar material may be treated by the process. Furthermore the interior of the chamber may be heated by other means than by the closed steam coils. It will also be observed that with certain classes of goods it may not be necessary to prevent condensation completely and the preliminary heating of air and final displacement of steam by heated air may be shortened or even omitted.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:

1. A process of the kind described, which comprises applying an inert gas as a vulcanizing medium to a vulcanizable plastic material in a chamber communicating with the atmosphere, and vulcanizing the plastic material by said inert gas while preventing the passage of air into the chamber by a counter-passage of gas.

2. A process of the kind described, which comprises applying steam superheated to a vulcanizing temperature to a vulcanizable plastic material in a chamber, vulcanizing the plastic material by the steam while maintaining communication between the chamber and the atmosphere and replacing the steam by heated air on completion of vulcanization.

3. A process of vulcanizing articles consisting in maintaining a chamber filled with steam at substantially atmospheric pressure and substantially excluding air from articles contained therein, and super-heating the steam to effect vulcanization.

4. A process of vulcanizing articles consisting in maintaining a chamber which is open to the atmosphere filled with steam, substantially excluding air from articles contained therein, and heating the steam therein to effect vulcanization.

5. A process of vulcanizing articles, which consists in preliminarily heating articles in a chamber to a temperature below the usual temperature of vulcanization, then displacing with steam the atmosphere within the chamber while it is vented to the atmosphere, and finally superheating the steam to and maintaining it superheated at a commercial vulcanizing temperature with the chamber open to the atmosphere.

6. In a process of vulcanizing articles in a heater vented to the atmosphere, the step of effecting vulcanization while the articles are immersed in an inert heating gas excluding air therefrom.

7. In a process of vulcanizing articles in an open heater, the step of effecting vulcanization while the articles are immersed in steam between 250° and 290° F. substantially excluding air therefrom.

8. A process of vulcanizing articles in a heater whose interior is in communication with the atmosphere, including, maintaining the chamber filled with dry steam at a vulcanizing temperature of approximately 275° F. while substantially excluding air from the interior of the chamber.

9. A process of vulcanizing articles in a chamber having governable openings in its upper and lower portions, comprising, heating the air in the chamber while closed to a temperature of approximately 220° F. until articles contained in the chamber are at approximately 212° F., venting the lower portion of the chamber to the outside air, introducing steam into the upper portion of the chamber, and, when steam substantially fills the chamber, heating the steam to and maintaining it at a vulcanizing temperature suited to the articles while supplying enough steam to exclude air from contacting therewith.

10. In the vulcanization of rubber goods the step of subjecting them to the action of steam in direct contact therewith and in the substantial absence of air, the steam being maintained at approximately atmospheric pressure and superheated to the vulcanizing temperature.

11. In the vulcanization of rubber goods the step of subjecting them to a continuous current of steam in direct contact therewith and in the substantial absence of air and maintaining the steam at approximately atmospheric pressure superheated to the vulcanizing temperature.

12. A process of the kind described which comprises applying an inert gas at a vulcanizing temperature to a vulcanizable plastic material in a chamber, substantially excluding air from said chamber, and vulcanizing the plastic material while maintaining communication between the chamber and atmosphere and inert gas.

Signed at New York city, N. Y., this 8 day of December, 1916.

WILLIS A. GIBBONS.